March 17, 1931.  J. E. DIGGLE  1,797,132
TAP
Filed Sept. 15, 1930
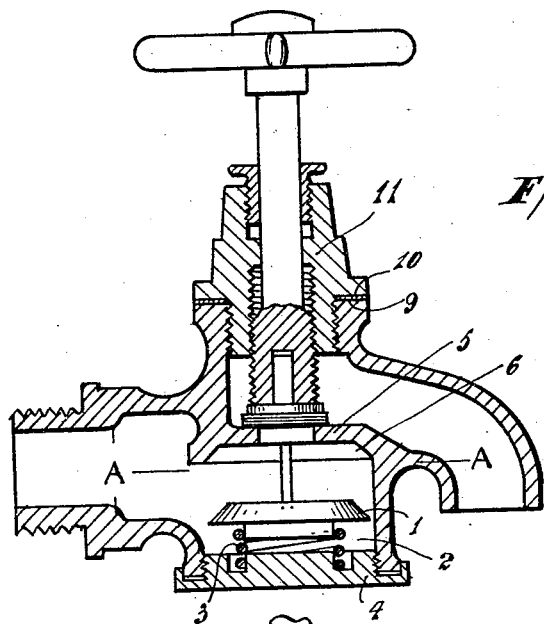
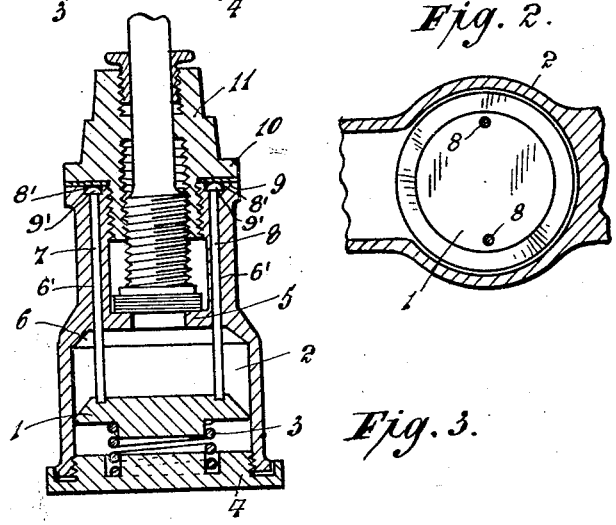
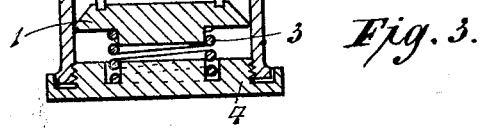
J. E. Diggle INVENTOR
By: Marks & Clerk ATTYS.

Patented Mar. 17, 1931

1,797,132

UNITED STATES PATENT OFFICE

JOHN EDWARD DIGGLE, OF NAPIER, NEW ZEALAND

TAP

Application filed September 15, 1930, Serial No. 482,069, and in New Zealand July 10, 1929.

This invention relates to high pressure liquid taps of the kind in which the valve is controlled by a stem threaded into a gland and seated upon a valve seating within the tap and in which a check valve is adapted to seat itself upon the underside of the seating.

The object of the present invention is to permit of the gland and valve being removed without shutting off the water to the tap, and also to prevent the tap leaking should the ordinary washer be worn, thus removing the objectionable dripping which occurs at such times.

According to the present invention, a check valve is arranged beneath the usual valve seating, upon the underside of which is formed a face, the check valve being held down by rods which are in turn held down by the flange of the gland. The check valve normally tends to be projected against this valve seating by a coil spring bearing on the other side of the valve and against a plug screwed into an opening upon the underside of the tap, through which opening the check valve is inserted.

The invention will now be described with the aid of the accompanying drawings, wherein:—

Figure 1, is a longitudinal sectional elevation through the tap.

Figure 2, is a fragmentary sectional plan on line A—A Figure 1.

Figure 3, is a cross sectional elevation through the tap.

Referring to the drawings, the check valve 1 is located and guided in a circular recess 2 in the underside of the body of the tap having a coil spring 3 in compression between the underface of the valve and a plug 4 screwed into the opening. The usual valve seating 5 separating the inlet part from the outlet part of the tap is formed with another face 6 preferably conical against which the spring 3 normally tends to seat the valve 1. Rods 7 and 8 fitted in bores 6' formed in the tap, said bores opening at their upper ends into recesses 8' formed in the seating 9. The lower ends of the rods rest upon the upper face of the valve 1, or may enter holes therein as shown. The rods are retained in their normal position by the flange 10 of the gland 11, as shown in Figure 3. The upper ends of the rods are provided with rounded heads 9' which seat in the recesses 8', and it will be observed that when the flange 10 is firmly engaged with the seating 9 the heads of the rods will be prevented from moving upwardly, thus preventing leakage of fluid through the bores 6'. When the gland 10 is unscrewed, the spring 3 will raise the rods and allow the valve 1 to seat upon the face 6, thus closing the outlet of water through the tap. A washer or other sealing would be inserted between the flange 10 and the seating 9, and the rounded heads will prevent injury to the washer. The rods 7 and 8 prevent wear on the check valve and spring 3 since these parts are not continually in use.

What I claim is:—

A tap comprising a body having upper and lower valve seats therein, a gland threaded in the body, a flange on the gland, a main valve adjustable in the gland for engagement with the upper seat, an auxiliary spring pressed valve in the body, said body having diametrically disposed bores formed therein, said body having recesses therein into which the upper ends of the bores open, rods passing through the bores and having their lower ends engaged with the auxiliary valve, said rods having heads on the upper ends engaged in the recesses, the flange being adapted to normally retain the heads in the recesses and the auxiliary valve normally disengaged from the lower seat, said flange also serving to close the recesses to prevent leakage of fluid through the bores and recesses.

In testimony whereof, I have signed my name to this specification.

JOHN EDWARD DIGGLE.